No. 780,542. PATENTED JAN. 24, 1905.
R. P. TOMASSEK & I. H. SAMPERS.
CAR WHEEL.
APPLICATION FILED MAY 25, 1904.

2 SHEETS—SHEET 1.

Witnesses:
F. G. Hachenberg
Henry Thieme

Inventors:
Romeo P. Tomassek
Isidore H. Sampers
By Brown & Seward
their Attorneys

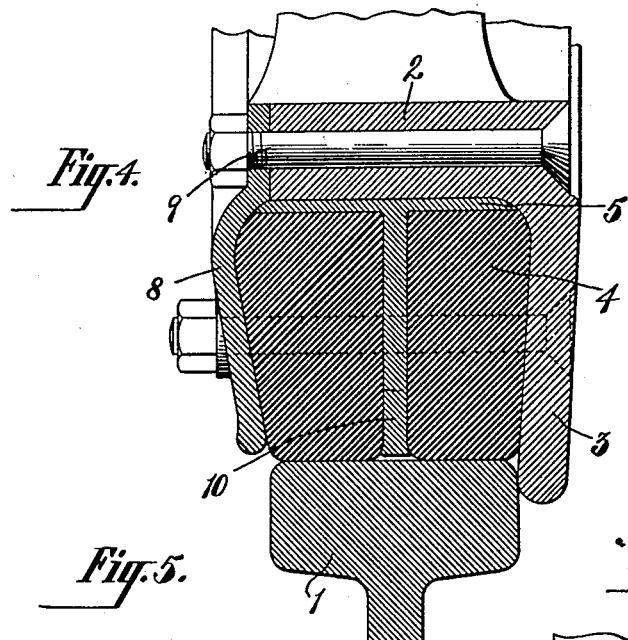
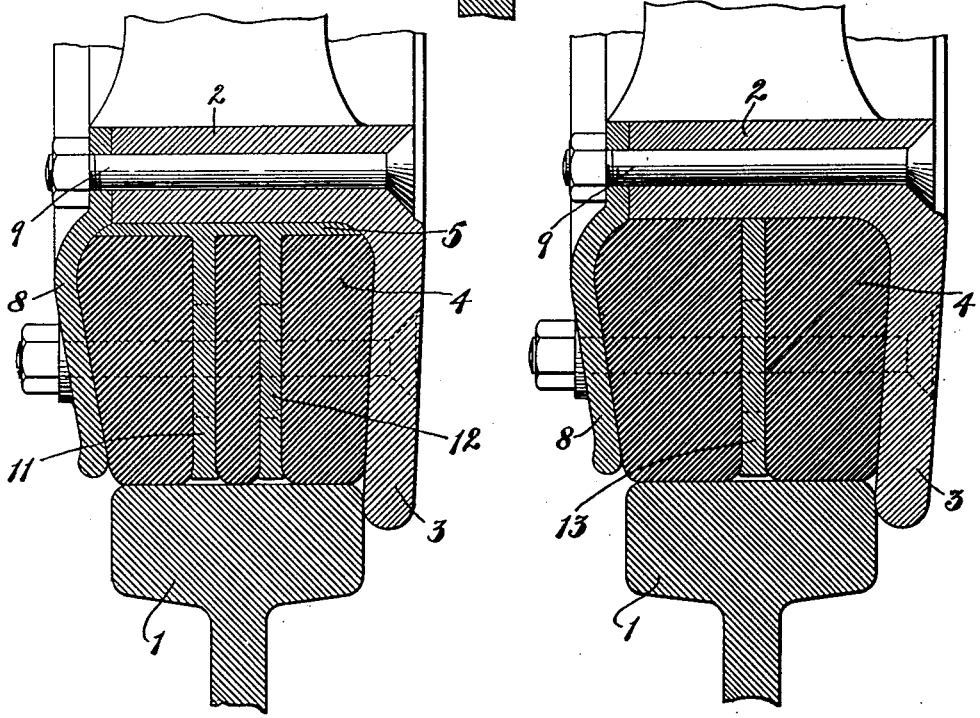

No. 780,542.                                                                                      Patented January 24, 1905.

UNITED STATES PATENT OFFICE.

ROMEO P. TOMASSEK AND ISIDORE H. SAMPERS, OF NEW YORK, N. Y., ASSIGNORS TO THE NOISELESS CAR & CAR WHEEL COMPANY, OF NEW YORK, N. Y., A CORPORATION OF NEW YORK.

CAR-WHEEL.

SPECIFICATION forming part of Letters Patent No. 780,542, dated January 24, 1905.

Application filed May 25, 1904. Serial No. 209,780.

*To all whom it may concern:*

Be it known that we, ROMEO P. TOMASSEK and ISIDORE H. SAMPERS, citizens of the United States, and residents of the borough of Manhattan, in the city and State of New York, have invented a new and useful Car-Wheel, of which the following is a specification.

Our invention relates to car-wheels, and more particularly to car-wheels provided with an elastic tire, the object being to provide an elastic tire which will successfully sustain unusually heavy loads.

A practical embodiment of our invention is represented in the accompanying drawings, in which—

Figure 1:
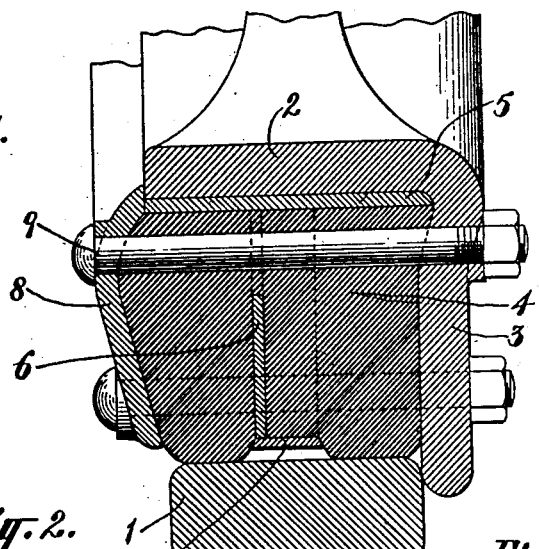
Figure 2:
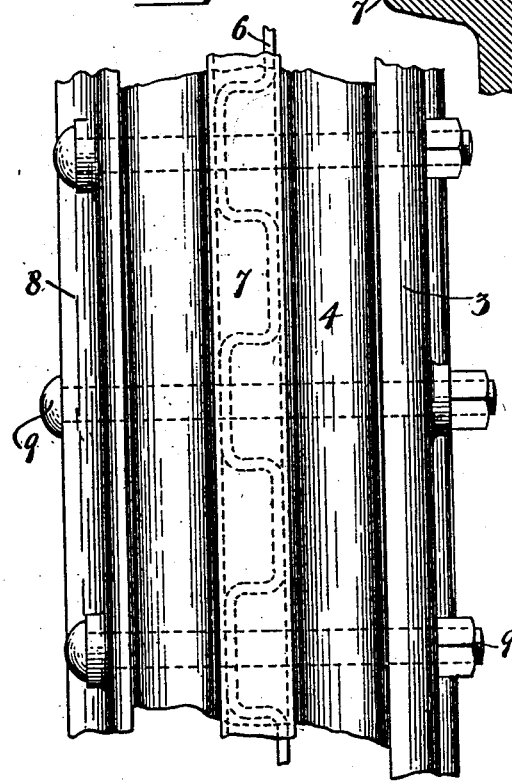
Figure 3:
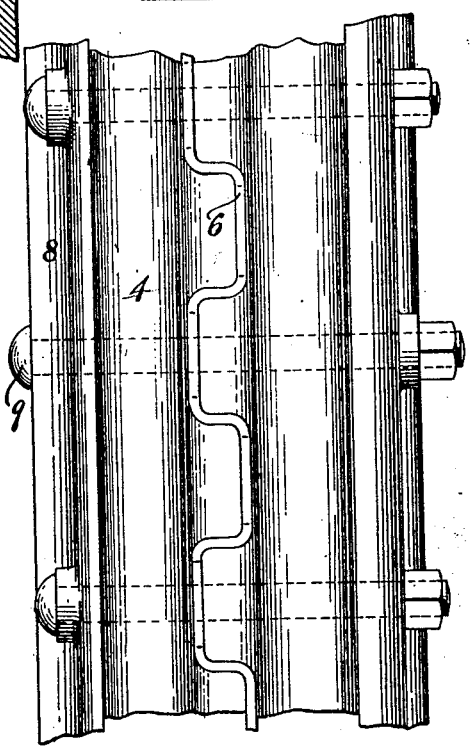

Figure 1 is a transverse section through the rim and tire of a car-wheel and through the head of a railway-rail on which the wheel is intended to travel when in use. Fig. 2 is a partial face view of the same. Fig. 3 is a partial face view of a modified form, and Figs. 4, 5, and 6 are transverse sections of modified forms.

The railway-rail on which the wheel is intended to travel is denoted by 1. The rim of the car-wheel is denoted by 2. Its flange, which projects over the inner edge of the rail to hold the wheel on the rail, is denoted by 3, and the elastic tire, which may be rubber, is denoted by 4.

The gist of our invention lies in so disposing the flanged ring which is relied upon to hold the tire in position and prevent it from creeping on the rim of the wheel that its embedded flange will serve to assist the elastic tire in supporting the load when the load shall have become so great as to compress the elastic tire to the limit of its practical working compression. To this end the tire-holding ring preferably consists of a band 5, which is intended to encircle the periphery of the rim 2 of the wheel, to which rim the said band is made fast either by close frictional contact or by suitable fastening devices of well-known or approved form, while the skeleton flange 6, which is embedded in the elastic tire 4, extends radially outwardly from the band 5, of which it forms a part, and terminates at its outer edge at a predetermined distance inwardly from the normal position of the outer face of the elastic tire 4.

The flange 6, as represented in Figs. 1 and 2, consists of a corrugated or sinuous web, as indicated in dotted lines, Fig. 2, and an outer smooth rim 7, the width of the rim 7 being substantially the same as the extreme width of the sinuous web.

On the side of the tire 4 opposite the flange 3 there is an annular keeper 8, which extends along down the outer side of the rubber tire 4 to within a short distance of its outer face, and this keeper 8 is bolted to the flange 3 on the rim of the wheel by bolts 9, arranged in staggered order around the wheel, the said bolts extending through the rubber tire 4 and through perforations in the sinuous web of the tire-holding ring.

In the form shown in Fig. 3 the outer or peripheral band or ring 7 is omitted, and the outer edge of the web is left in its sinuous condition.

It is to be understood that the tire 4 is to be molded on opposite sides and through the perforations in the sinuous flange 6, by which it becomes thoroughly locked to the band 5 throughout its entire extent, and through the band 5 and the bolts 9 becomes completely locked to the rim of the wheel throughout its entire extent, so that there is no creeping possible. Furthermore, as the rubber tire becomes compressed under a heavy load and when it has reached a point of compression beyond which it would be impracticable for it to extend, the outer face, either the rim 7 or the sinuous outer edge of the web of the flange, engages and travels along the face of the rail, thereby assisting the tire to support and preventing the elastic tire 4 from becoming unduly compressed.

In Fig. 4 the embedded flange is denoted by 10 and extends outwardly in a plain form, as distinguished from the sinuous form shown in Figs. 1, 2, and 3.

In Fig. 5 a plurality of embedded flanges are shown denoted by 11 and 12, and in Fig. 6 the encircling band portion 5 of the tire-holding ring is omitted and the embedded flange 13 is permitted to engage directly with the rim of the wheel.

It is to be understood that the several flanges shown in Figs. 4, 5, and 6, like those shown in Figs. 1, 2, and 3, are perforate or skeleton to permit the elastic body of the tire to fill the openings when the tire is molded therein.

What we claim is—

1. A wheel having an elastic tire on its rim, the said tire having molded therein a holding-flange, the said flange being radially disposed with respect to the face of the wheel, and the elastic tire normally projecting outwardly beyond the periphery of said holding-flange.

2. A wheel provided on its rim with an elastic tire, a holding-ring comprising a band portion fitted to the rim of the wheel and a flange portion extending radially outward from the rim of the wheel and embedded in the elastic tire, the said elastic tire having its outer face normally extended outwardly beyond the outer face of said radially-extending flange.

3. A wheel provided with an elastic tire on its rim and a holding-ring comprising a band portion fitted to the rim of the wheel and a sinuous flange portion projecting outward from the band and embedded in the elastic tire.

4. A wheel comprising a rim having a flange projecting therefrom on the inner side of the rim for holding the wheel on a rail, an elastic tire seated on the rim, a holding-ring comprising a band portion fitted to the rim of the wheel and a flange portion extending radially from the band portion and embedded in the elastic tire, an annular keeper-ring engaged with the outer side of the elastic tire and bolts extending through the outer keeper-ring, the elastic tire, the radial flange embedded therein and the inner flange on the wheel.

5. A wheel provided with an elastic tire, a holding-ring consisting of a band portion fitted to the rim of the wheel and a sinuous flange extending radially from the said band portion and embedded in the elastic tire and a smooth facing or rim on the outer face of the said sinuous web or flange.

In testimony that we claim the foregoing as our invention we have signed our names, in presence of two witnesses, this 19th day of May, 1904.

ROMEO P. TOMASSEK.
ISIDORE H. SAMPERS.

Witnesses:
FREDK. HAYNES,
HENRY THIEME.